United States Patent [19]
Hankison

[11] 3,844,606
[45] Oct. 29, 1974

[54] VEHICLE HEAT DISSIPATING AND/OR INCLEMENT WEATHER CONVENIENCE WINDOW OPERATING SYSTEMS

[76] Inventor: Paul M. Hankison, 106 Oakwood Rd., McMurray, Pa. 15317

[22] Filed: Oct. 13, 1972

[21] Appl. No.: 297,227

[52] U.S. Cl.................. 296/146, 49/72, 98/2.18
[51] Int. Cl................................................ B60j 1/00
[58] Field of Search ............ 296/146; 180/112, 111, 180/113; 98/2.01, 2.00, 2.18; 49/72, 142, 103

[56] References Cited
UNITED STATES PATENTS

| | | | |
|---|---|---|---|
| 1,941,363 | 12/1933 | Norviel............................ | 98/2.01 X |
| 2,124,037 | 7/1938 | Lavigne .............................. | 180/112 |
| 2,576,816 | 11/1951 | Wahlberg........................ | 180/112 X |
| 2,696,981 | 12/1954 | Ayers, Jr............................. | 49/72 X |
| 2,793,907 | 5/1957 | Hess et al. .......................... | 49/72 X |
| 2,991,069 | 7/1961 | Onksen et al........................ | 49/72 X |
| 3,024,062 | 3/1962 | Himka et al. ........................ | 49/72 X |
| 3,168,303 | 2/1965 | Skinner............................. | 49/103 X |
| 3,339,665 | 9/1967 | Johnstone et al................... | 180/113 |
| 3,357,338 | 12/1967 | Pollock............................ | 98/2.18 X |

Primary Examiner—David Schonberg
Assistant Examiner—David M. Mitchell
Attorney, Agent, or Firm—Donn J. Smith

[57] ABSTRACT

A vehicle window operating system for internal heat dissipation and other purposes includes a plurality of motors for powered vehicle windows having actuating switches for the motors and a normally open lock-switch coupled to at least one entry lock of the vehicle. The lock switch is connected to an energizing circuit coupled to the window motors in by-passing relation to the motor actuating switches. Optionally the operating circuit comprises a vehicle defroster or other blower motor and actuating switch similarly by-passed by the energizing circuit.

9 Claims, 5 Drawing Figures

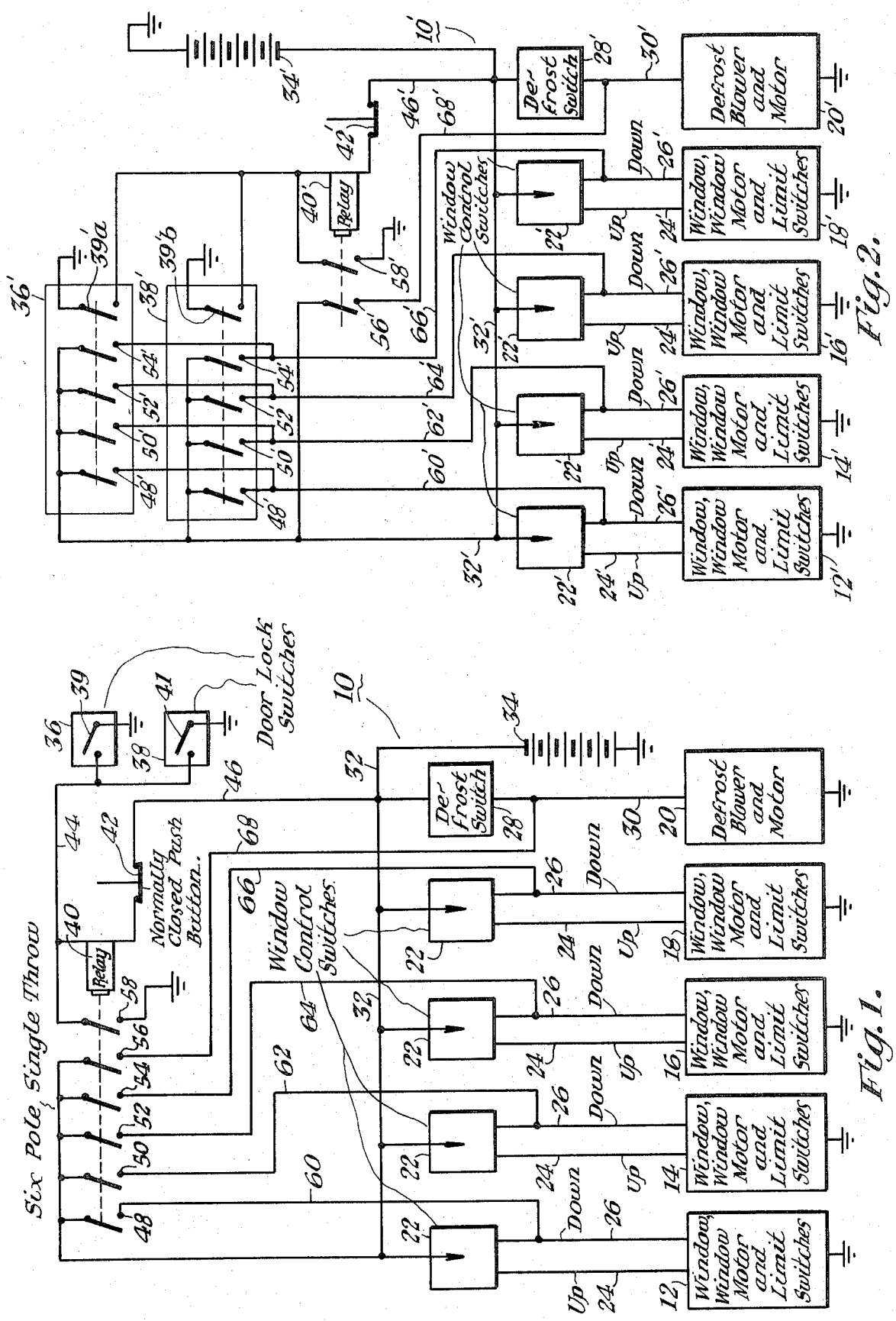

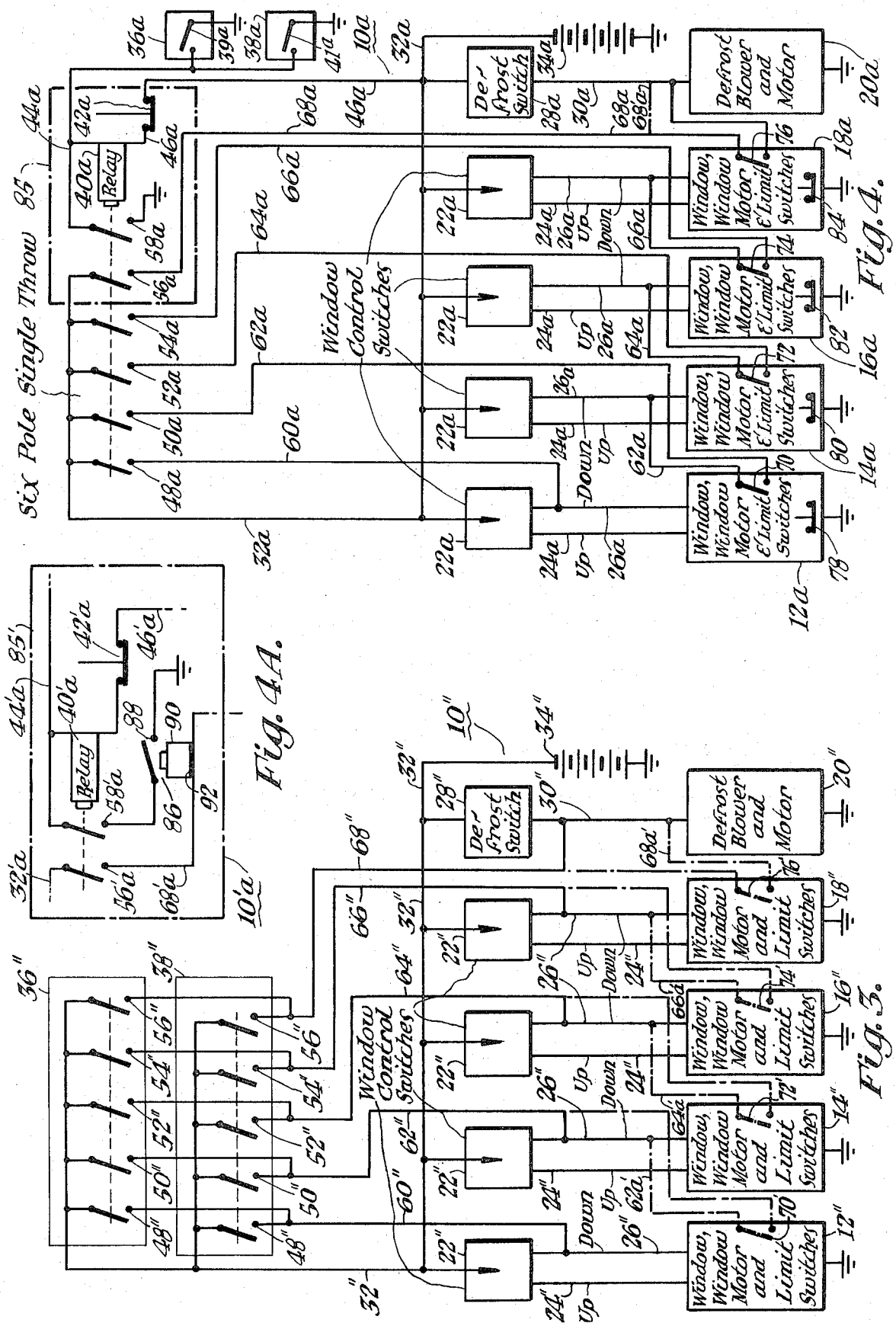

VEHICLE HEAT DISSIPATING AND/OR INCLEMENT WEATHER CONVENIENCE WINDOW OPERATING SYSTEMS

The present invention relates to vehicle window-lowering arrangements, and more particularly to such arrangements especially useful in dissipation of heat from vehicle passenger compartments in conjunction with air-conditioned vehicles. Certain features of the invention are useful under inclement weather conditions where heat dissipation is not necessarily a factor.

Although the invention is described primarily in conjunction with air-conditioned automotive vehicles, it will be readily apparent that the invention finds utility for various purposes on virtually all vehicles provided with powered windows.

When an automobile or other vehicle is parked in the sun, particularly in warm weather, considerable heat is developed within the passenger compartment owing to the greenhouse effect. When the driver or other occupant of the vehicle re-enters the occupants' compartment under these conditions it is necessary to first wind down some or all of the windows to provide the necessary cross ventilation for lowering the temperature within the passenger compartment to bearable levels. This problem can be alleviated to a degree when the vehicle is provided with powered windows having the usual master switches on the driver's side. However, a number of time-consuming motions are involved in unlocking and opening the door, inserting the key in the ignition switch and locating and depressing some or all of the window switches. In these days of hustle and bustle such motions desirably are obviated and my present invention is directed to this end.

Lowering the windows in the aforementioned conventional powered fashion provides little or no air movement within the passenger compartment beyond that afforded by ambient movements of the outside air.

Moreover, manufacturers of automotive air conditioning equipment recommend dissipation of the accumulated heat in the passenger compartment before operation of the air conditioner, to prevent overloading of the equipment. In consequence the vehicle windows usually are lowered to aid in heat dissipation, which is not completed until after the vehicle passengers have been subjected to considerable discomfort. The vehicle air conditioner usually is started as soon as the occupant or occupants enter the vehicle and start the engine such that there is little or no time even with the convenience of the usual master switches to permit lowering followed by raising the vehicle windows after heat dissipation. Unfortunately, at the elevated temperatures frequently developed in the vehicle passenger compartment during the warm weather months, the air conditioning equipment requires several minutes to afford comfortable temperatures within the occupants' compartment.

The seriousness of this problem is attested to by the fact that the interior of the vehicle often reaches temperatures of 140°F -150°F in the Temperate Zone. When a driver enters the car it is often debatable whether to start the engine to activate the air conditioning equipment for direct cooling of the occupants' compartment or to lower the windows prior to starting the engine and activating the air conditioner. Most air conditoned cars have a lock-out mechanism that will not permit the driver to do both at the same time in order not to put too great a demand on the vehicle electric system.

Another problem arises when the driver and one or more passengers wish to enter a locked automobile at the same time. In the vast majority of cases it is necessary for the driver either to first unlock the door on the passenger's side before unlocking the driver's door, or to unlock the driver's side first and then enter the automobile and reach across the passenger compartment to release the inside lock on one or more of the passenger doors. In either case considerable time is expended, and, in very hot or inclement weather either the driver or the passengers are exposed unnecessarily for longer or shorter periods of time to the extremely hot condition within the vehicle or to the rain, wind, sleet or snow during inclement weather.

In accordance with the present invention I unexpectedly provide an arrangement whereby the driver of the vehicle can lower one or all of the vehicle windows, either partially or completely, without the necessity of his entering the vehicle compartment. Thus, the most objectionable portion of accumulated heat can be exhausted from the vehicle interior, or exposure to inclement weather minimized while the driver or other occupant(s) gain entrance to the vehicle. In accordance with another feature of the invention I provide at least during hot weather for automatic and simultaneous or sequenced actuation of one of the vehicle blowers, such as the defroster fan, to aid in exhausting heat from the occupants' compartment. When incorporated into the automatic window operational system the blower likewise can be operated automatically without the necessity of the driver's or passenger's entering the vehicle. I also provide means for deactivating my novel circuitry including turning off the blower after it has served its purpose, which means can be made automatic in accordance with still another feature of my invention.

I also provide means for lowering the vehicle windows in sequence and also for energizing the aforementioned blower (if used) sequentially, in order to reduce the instantaneous drain upon the vehicle electrical system. In further accord with this aspect of my invention the window energizing circuit can be arranged to delay operation of subsequent windows until the preceding window is either fully or partially lowered. As an optional feature, I can arrange the window actuating circuits such that the window operating sequence can be terminated as desired after one, two or more of the windows are partially or completely lowered. This is particularly advantageous in case of inclement weather where the window operating system is actuated solely for the purpose of permitting quick access to the inside door unlocking mechanism from outside (particularly the front passenger side) of the vehicle. This permits nearly simultaneous entry by two or more individuals to minimize exposure of all passengers, including the driver. On the other hand, where one of the vehicle blowers is coupled to the window actuating system, energization of the blower desirably is continued after release of the vehicle lock switch or the like so that operation of the blower is not interrupted while the driver or other occupants are entering the vehicle and until after the vehicle air conditioning system has been actuated.

Insofar as I am aware no attempts for the specific solution of the problem set forth above have been made. I am aware of a number of arrangements for controlling vehicle windows for various purposes, for example the U.S. patents to Hess et al. 2,793,907, Lavigne 2,124,037; Ayers Jr. 2,696,981; Onksen et al. 2,991,069; Ackman 3,228,490; Abrams 3,135,545; and Himka et al. 3,024,062. The Hess et al. arrangement prevents a station wagon tailgate from opening when the tailgate window is in the up position. A two position switch is mounted on the rear wall of the tailgate for operating the window in either direction. Lavigne provides a vehicle power window system to raise all of the windows automatically when an entry lock switch is actuated to lock the vehicle. Ayers, Jr., Abrams, and Ackman disclose locking and window control systems for an automotive vehicle wherein one push button switch locks all four doors of the vehicle and all of the windows are automatically run to their closed positions simultaneously. Onksen et al. describes an automatic vehicle window control system wherein a thermostat switch energizes the window motors to move the windows to a half open position when the outside air temperature is less than the inside or set temperature. The thermostatic switch is connected in a circuit including switches operated by the front door locks to prevent actuation of the window motors unless the doors are unlocked. A rain sensitive switch also is included to raise the windows to their closed positions. Himka et al. is of lesser interest.

None of the cited references discloses a system for lowering one or more vehicle windows to their lowermost positions, which system can be actuated optionally by the driver of the vehicle from a point outside of the vehicle. On the other hand there is no disclosure of an arrangement for optionally lowering one or more of the vehicle windows to some intermediate position between fully open and fully closed from a point outside of the vehicle, as provided by another feature of my invention. In contrast to still another feature of my invention, the prior art does not provide means for energizing a vehicle blower to aid in dissipating heat through the opened windows.

The aforementioned deficiencies of the prior art, insofar as solution of the present problem is concerned; are of course overcome by my present invention. In further accordance with my invention, I provide a circuit for so energizing the windows including a two-positioned vehicle entry lock with an optional position of the entry lock being capable of actuating a switching arrangement for the powered windows of the vehicle. In accord with another feature of my invention, one of the vehicle blowers is simultaneously actuated to aid in exhausting heat from the occupants'compartment of the vehicle. In another feature I also provide a single push-button switch for deactivating the switching arrangement and turning off the blower. Alternatively or in conjunction therewith I can incorporate at least part of the last-mentioned switching means with the ignition switch of the vehicle. These latter features of the invention likewise are not found in the prior art insofar as I am aware.

I accomplish these desirable results by providing a vehicle window operating system comprising a plurality of motors for powered vehicle windows having actuating switches for said motors, a normally open lock-switch coupled to at least one entry lock of the vehicle, said lock switch being connected to an energizing circuit coupled to said window motors in by-passing relation to said motor actuating switches.

I also desirably provide a similar vehicle window operating system including a vehicle blower motor and actuating switch therefor coupled to said energizing circuit in by-passing relation to said blower actuating switch.

I also desirably provide a similar vehicle window operating system wherein said blower is a vehicle defrost blower.

I also desirably provide a similar cooling system for a vehicle compartment wherein said energizing circuit includes a relay switching arrangement having contact means coupled to a vehicle battery and coupled respectively to said window motors.

I also desirably provide a similar cooling system for a vehicle compartment wherein said energizing circuit include means for actuating said window motors sequentially and also said blower motor, if used.

I also desirably provide a similar cooling system for a vehicle compartment wherein said sequential actuating means include a limit switch for a succeeding window motor positioned at a preselected position along an operating path of a preceding window so that lowering of said succeeding window is commenced upon lowering of said preceding window to a predetermined extent.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIG. 1 shows a schematic circuit diagram for automatically winding down the vehicle windows in accordance with the invention. The diagram shows also further optional features of the invention whereby a vehicle blower is energized simultaneously with simultaneous actuation of the window motors, and a single control switch is provided for deactivating the window motor circuit and de-energizing the blower motor (when used).

FIG. 2 shows a similar schematic circuit wherein circuit means are associated with each door switch for simultaneously lowering the vehicle windows to a predetermined extent, as controlled by operation of the door lock switch.

FIG. 3 is a similar diagram showing another embodiment of the invention whereby vehicle window arrangements and a blower are energized simultaneously but only so long as a vehicle lock assembly is held in an overturned position.

FIG. 4 is a similar schematic circuit diagram for sequential operation of the window motors and of the blower motor (when used).

FIG. 4A is a schematic circuit diagram of an alternative relay and reset circuit for use in the window operation system of FIG. 4.

The FIG. 4A circuit also includes means for terminating the window-lowering and blower (if used) actuating sequence after lowering of one or more windows but before actuation of the vehicle blower.

With more detailed reference now to FIG. 1 of the drawings, a vehicle window operating system 10 as shown therein comprises a series of window motors and limit switches denoted generally at the reference numerals 12, 14, 16, 18 and a blower motor 20. The window motors and limit switches 12-18 are components of conventionally powered window systems currently supplied on many types of automobiles. The blower motor 20 can be the prime mover of any of the blowers conventionally supplied on most automotive vehicles, for example the defroster blower, the heater blower, or a separate blower (if provided) for the vehicle air conditioning system.

Conventionally each of the window motors 12-18 is controlled by a two-position switch 22 coupled through "up" and "down" circuits 24, 26 to the associated one of the window motors 12-18. Similarly an on-off switch 28 is connected to the vehicle blower 20 through conductor 30. Each of the switches 22 and 28 are connected through branched conductor system 32 to vehicle battery 34. Of course, other electrical equipment (not shown) of the automobile (not shown) is also connected to the vehicle battery 34.

To actuate the window and blower motors 12-20 from a point outside of the vehicle the entry lock assembly 36 of at least the driver's side of the vehicle is provided with a normally open lock switch 39. In this case the vehicle entry lock 36 is provided with a first or unlocking position and also with a further or overturn position, such that a farther rotation of the key in the vehicle entry lock 36 will close the lock switch 39. Such entry lock and lock switch combinations are readily available. The vehicle lock assembly 38 at the passenger entrance to the vehicle can be similarly provided with lock switch 41 in parallel with the lock switch 39. In consequence the window and blower circuit 10, in this latter modification, can be actuated from either side of the vehicle. In any of the several forms of the invention, conventional lock switch means separate from the usual vehicle entry lock can be mounted on any convenient exterior surface of the vehicle. For convenience, however, such separate lock switch can be mounted adjacent one or more entry locks of the vehicle and can be operated by the ignition key, the trunk or glove compartment key or by a separate key.

The lock assembly 36, and also the lock assembly 38 if used, is connected in series with relay coil 40 and a normally closed push button or other suitable type switch 42 to the vehicle battery 34 through conductors 44, 46, and the branched conductor 32, to energize the relay coil 40. The relay coil 40 controls the operation of a normally open, in this example six-pole, single-throw switching arrangement including contacts 48-58. It will be appreciated, of course, that the number of the contacts 48-58 can be changed depending upon the number of powered windows and vehicle blowers pressed into service to aid in exhausting heat from the vehicle passenger compartment (not shown).

Although other vehicle blowers can be utilized as aforesaid, the defrost blower is admirably suited for this purpose as it projects currents of air upwardly across the vehicle windshield and immediately below the dome of the vehicle roof and aids in circulating air which otherwise would be trapped beneath the dome of the vehicle and above the window openings.

Relay contact 58 provides, when closed, an electrical latch for the relay coil whereby the relay coil 40 remains connected to the vehicle battery 34 following the momentary closure and reopening of the lock switch 39 or 41. The relay coil 40 thus remains energized, in this embodiment of the invention, until subsequent operation of the switch 42, as described below.

The remaining relay contacts 48-56 are connected respectively through conductors 20-68 to the window motors 12-18 and the vehicle blower motor 20. The window motor conductors 60-66 are connected directly to the down circuit conductors 26 in by-passing relation to the conventional single-pole double-throw window control switches 22. On the other hand conductor 68 bypasses the single-pole, single-throw blower switch 28 and is connected to its single outlet conductor 34.

In operation of the embodiment illustrated in FIG. 1, the driver of the vehicle or other individual having a key thereto inserts the key into one of the door lock and switch assemblies 36 or 38. Initial turning of the key unlocks the associated vehicle door while further turning of the key momentarily closes the associated lock switch 39 or 41. As soon as the lock switch 39 or 41 is momentarily closed, the vehicle key can be withdrawn. Of course, if it is not desired to energize the window and blower circuit 10, turning of the vehicle key can be terminated as soon as the vehicle door is unlocked, without actuating the associated lock switch 39 or 41.

Momentary closure of either lock switch 39 or 41 energizes the relay coil 40 sufficient to close the normally open latching contact 58 to maintain energization of the relay coil. At the same time relay contacts 48-56 are closed which energize the vehicle blower motor 20 and the down circuits 26 of the window motors 12-18. Thus, the vehicle windows are rolled down simultaneously along with energization of the vehicle defrost blower or other blower(s) customarily furnished with passenger automobiles and trucks. The heat developed within the vehicle compartment thus is rapidly and surprisingly dissipated through the opened windows by operation of the vehicle blower, before any occupant must enter the vehicle.

After the windows are thus lowered and the vehicle blower is energized it is only necessary for the vehicle driver or other individual to wait a few moments until the temperature of the vehicle compartment is reduced to tolerable levels before entering the vehicle. Otherwise the driver is forced to enter the vehicle, unlock the other doors, insert the ignition key, lower the windows, start the blower, and start the engine, all of which involve a long series of manual operations before the air conditioning equipment can be operated efficiently. Before actuating the vehicle air conditioning equipment, if provided, the normally closed push-button switch 42 can be actuated momentarily to de-energize the blower motor 20. Of course, by this time the down circuits 26 of the window motors 12-18 have been de-energized by the limit switches conventionally forming part of the motor and limit switch circuits 12-18. The momentary opening of the push button switch 42 electrically unlatches the relay 40 by opening latching contact means 58, and along with it the window and blower contact means 48-56. At this point the normal window control switches 22 can be actuated to raise the vehicle windows, as desired.

It is contemplated that a timed delay switch (not shown) can be substituted for the push button type switch 42 such that the window and blower circuit 10 is de-energized automatically after a period sufficient for reducing the vehicle compartment temperature to tolerable levels, whereupon the vehicle occupants can enter in comfort. Following these activities, the relay coil 40 would be de-energized automatically without further action by the driver of the vehicle. Alternatively, the normally closed switch 42 can be associated with the vehicle ignition switch (not shown) such that a cam or other operator thereof can momentarily open the switch when the vehicle ignition is turned on or when the vehicle starter motor is actuated.

On many occasions it is desired to lower the vehicle windows to a predetermined extent less than their fully lowered positions. This can be accomplished by the window operating system 10' of FIG. 2, wherein similar reference characters with primed accents denote similar components of FIG. 1. In the FIG. 2 embodiment of the invention, each door lock assemble 36' or 38' is provided, in addition to relay switch means 39'a or 39'b, with a series of contacts 48'-54'. The added contacts are closed simultaneously with the relay contacts 39'a or 39'b respectively when the vehicle key is inserted into the lock assembly 36' or 38' and overturned as before. The added switch contacts 48'-54' are connected in parallel to the down circuits 36' of the window arrangements 12'-18' through conductors 60'-66' respectively.

In operation overturning of either lock assembly 36' or 38' energizes the relay 40' which is connected through its contact means 56' solely to the vehicle blower arrangement 20'. At the same time the window arrangements 12'-18' begin to be lowered by closure of the respective lock assembly contact means 48'-54'. However, as the last-mentioned contact means are not controlled by the relay 40', lowering of the window arrangements 12'-18' continues only as long as the vehicle key is held in the overturned position. When the vehicle key is released or withdrawn from the lock assembly 36' or 38' further lowering of the window arrangements 12'-18' is immediately discontinued, if for any reason the occupant or occupants of the vehicle do not wish to have the vehicle windows lowered to their full extent. On the other hand, the blower relay 40' is electrically latched through its contact means 58' such that operation of the blower 20' continues until the reset switch 42' is momentarily opened as before.

The window operating system 10' is advantageous in those situations wherein it is not desired to lower the windows 12'-18' fully, for example where very young children may enter the vehicle, when the weather is not extremely warm, or it is somewhat inclement.

As evident from the chain outlines of conductors 62a'-68a' the window system 10' can be arranged for lowering only one of the windows 12'-18' or for lowering two or more of these windows sequentially as desired, for example for the purposes set forth below in connection with FIG. 4. If the vehicle key in the lock assembly 36' or 38' is maintained in the overturned position, the vehicle blower 20' (when provided) also is actuated sequentially after all of the windows have been lowered. Limit type switches 70'-76' are coupled in conductors 62a'-68a' respectively after the manner and for the purpose described in FIG. 4. However, the windows 12'-18' and the vehicle blower 20', while energized sequentially in FIG. 2, the operation is not fully automatic as in FIG. 4. In the FIG. 2 arrangement, operation of the window system 10' is terminated forthwith upon release of the vehicle key in the lock assembly 36' or 38'. Until the vehicle key is released as aforesaid, operation of the modified window operating circuit 10' (when provided with conductors 62a'-68a' and respective switches 70'-76', or some of them) is sequential when two or more of the vehicle windows are partially or fully lowered, depending upon the location of the limit type switches. If the vehicle key is held in its overturned position long enough to energize the vehicle blower 20' the vehicle key then can be released and the vehicle blower 20' will continue to operate by provision of the electrically latched relay 40', until the reset switch 42' is opened.

In certain applications of the invention it is desired to operate both the vehicle windows and the blower solely but semiautomatically under control of the vehicle lock assembly, for example where it is not desired for one reason or another to energize the vehicle blower after one or more occupants have entered the vehicle. Such arrangement is embodied in the window operating system 10'' as illustrated in FIG. 3, where similar reference characters with double-primed accents denote similar components of the preceding figures. In the FIG. 3 arrangement each of the vehicle lock assemblies 36'', 38'' is provided with an additional contact means 56'', with the contact means 56'' being connected in parallel to the vehicle blower arrangement 20''. When either vehicle lock arrangement 36'' or 38'' is turned to its overturned position the window switches 48''-54'' and the blower switch 56'' thereof are all closed simultaneously and thus maintained so long as the vehicle key is manually held in the overturned position of the lock assembly 36'' or 38''.

With the FIG. 3 arrangement, the vehicle key can be employed to limit the lowering of the vehicle windows 12''-18'' as in the preceding figure. By releasing the vehicle key and the associated lock assembly 36'' or 38'' from its overturned position, further lowering of the vehicle windows can be terminated if the windows have not already reached their bottom position. However, the omission of the holding relay 40 or 40' from the preceding figures results in terminating operation of vehicle blower 20'' also. On the other hand, the vehicle blower 20'' can be operated for a longer or shorter period following the complete lowering of the vehicle windows 12''-18'' by using the vehicle key to maintain the lock assembly 36'' or 38'' in its overturned position wherein all of the associated switches or contact means 48''-56'' are maintained in their switch-closed positions. Thus, at least one of the vehicle occupants will remain outside the vehicle to maintain energization of the vehicle blower 20'', until excess passenger compartment heat is dissipated. During any extended operation of the vehicle blower 20'', the vehicle window systems 12''-18'' are, of course, automatically de-energized at their bottom positions by their conventionally included lower limit switches.

As pointed out in connection with FIG. 1, it is contemplated that the vehicle blower 20' or 20'' can be omitted from the embodiment of FIG. 2 or 3 respectively, together with the associated components, where, for one reason or another, this feature of the invention is not needed or desired. Alternatively, the latching feature of the relay 40 can be eliminated, by omitting contact means 58 and associated components of FIG. 1, to produce essentially the same result as operation of the FIG. 3 embodiment.

As in the FIG. 2 arrangement, the vehicle window arrangements 12''–18'' and the vehicle blower 20'' (if used) can be interconnected by means of the optional conductors 62a'–68a' and limit type switches 70'–76' respectively. The window operating system 10'' can be inactivated after one or more of the vehicle windows 12''–18'' are fully or partially lowered. Similarly the vehicle blower 20'' can be energized only by further retention of the vehicle key in the overturned position in the lock assembly 36'' or 38'' after the last vehicle window 18'' has been lowered sufficiently to close the associated limit switch 76' (when provided). Until deactivation of the window system 10'' by release of the overturned key, two or more of the windows 12''–18'' (and the blower 20'', if used) are actuated sequentially when provided with the optional conductors and switches. In either case (with or without the sequential conductors 62a'–68a' and switches 70'–76'), the vehicle blower 20'' will be actuated only as long as the vehicle key is maintained in the overturned lock position.

Where it is desired to avoid sudden drains at the vehicle battery 34, it is contemplated that the window operating system 10 or 10' or 10'' can be modified to actuate the aforementioned and associated window motors sequentially, and also the blower motor (if used). This can be accomplished by use of the window operating system 10a shown in FIG. 4, wherein similar reference numerals complemented with the letter "a" denote similar components of the FIG. 1 system. The window operating system 10a is provided with means forming part of its energizing circuit for actuating window motors 12a–18a in sequence. Where the defroster blower or other vehicle blower 20a is also energized by the window operating system 10a such sequential actuating means desirably is extended to the blower motor also.

One form of such sequential actuating means includes a number of normally open, limit-type switches 70, 72, 74, 76 which are respectively associated with the vehicle window arrangements 12a, 14a, 16a, 18a. In those applications wherein the vehicle blower arrangement 20a is not connected to the vehicle window operating system 10a, the last switch 76 in the series can be omitted. As is evident from FIG. 4 each of the limit switches 70, 72, 74 are connected respectively in the by-passing circuits (conductors 62a, 64a, 66a respectively) of the window arrangements 14a, 16a, 18a. The fourth and final limit switch 76 (assuming four vehicle window arrangements 12a–18a, as shown) is similarly coupled to the by-passing circuit (conductor 68a) for the vehicle blower and motor arrangement 20a.

In furtherance of this purpose, each of the limit switches 70–76 are connected respectively in series with the bypassing conductors 62a, 64a, 66a, 68a to the down conductors 26a of the window arrangements 14a, 16a, 18a and to the blower conductor 30a of the blower arrangement 20a. Thus, the vehicle window arrangements 14a, 16a, 18a cannot be energized until the normally open limit or sequencing switches 70, 72, 74 (which are sensitive to positions of preceding windows) are closed by lowering of the immediately preceding window arrangements 12a, 14a, 16a respectively. By the same token, the vehicle blower arrangement 20a (when connected to the window operating system 10a) cannot be actuated by the system 10a until its sequencing switch 76 is closed by lowering of the last vehicle window arrangement 18a in the series of vehicle window arrangements 12a–18a.

The limit type sequencing switches 70–76 can be mounted adjacent the bottoms of the paths of travel of the window arrangements 12a–18a as are the lower normally closed window switches 78–84 conventionally provided with the powered window arrangements 12a–18a respectively. The limit switches 78–84 interrupt operation of the window motors at the lower limits of the vehicle windows respectively.

Alternatively the limit type sequencing switches 70–76 can be disposed intermediate the ends of the window paths such that window arrangement 14a is actuated, for example when the preceding window arrangement 12a has been lowered to about one half its total downward travel. Thus, lowering of the window arrangement 14a will be commenced while window arrangement 12a continues its downward travel. Again assuming the sequencing switches are located at mid points in the window travel paths, the third window arrangement 16a in the sequenced series of window arrangements 12a–18a will not commence operation until operation of the first window arrangement 12a is terminated, and so on. In the latter example a considerable reduction in the instantaneous drain upon the vehicle battery 34a still is attained but of course, the drain is not reduced to the extent occasioned by locating the sequencing switches 70–76 at the lower ends of the window paths.

In operation of the FIG. 4 embodiment, the initial vehicle window arrangement 12a in the sequenced series of window arrangements 12a–18a is operated immediately upon actuation of one of the vehicle entry lock and lock switch arrangements 36a, 38a to close the switch 39a or 41a associated therewith. Closure of the lock switch 39a or 41a immediately energizes relay 40a of the relay and reset circuit denoted generally by reference numeral 85 to close simultaneously all of the window and blower switch means 48a, 50a, 52a, 54a, 56a. After momentary closure of the lock switch 39a or 41a the associated lock assembly 36a or 38a can be released owing to the electrical latching feature provided by contact means 58a. Immediately, the initial window arrangement only, for example the window arrangement 12a, is lowered. The remaining window arrangement 14a, 16a, 18a are then actuated automatically and sequentially followed by similar actuation of the vehicle blower 20a, owing to continued closure of relay contact means 48a–56a. The entire sequential operation of the circuit 10a, therefore, proceeds automatically.

If the integrated vehicle blower feature of the invention is not desired, the relay contact means 56a, the blower arrangement 20a, and associated components can be omitted from the cirucit 10a. On the other hand, if it is desired to commence operation of the blower 20a with lowering of the first window arrangement, the blower sequencing switch 76 can be omitted from the last window arrangement 18a and conductor 68a can be connected directly to the input blower motor conductor 30a through alternative conductive segment 68'a.

In the arrangement of FIG. 4, once the blower 20a is actuated automatically with lowering of the first window arrangement 12a (through conductor segment 68′a) or after actuation of the last window arrangement 18a (blower sequencing switch 76), operation of the blower 28a continues, owing to the latching feature of relay 40a, until the reset switch 42a is opened momentarily. Energization of the individual vehicle windows 12a–18a is of course terminated automatically by conventional lower limit switches 78–84 respectively.

To permit selective as well as sequential operation of one or more of the vehicle window arrangements 12a–18a, and of the vehicle blower 20a if used, the latching contact means 58a and associated components of FIG. 4 can be omitted. After sequential operation of the vehicle windows 12a–18a the lock assembly 36a or 38a must be retained in its overturned position as long as continued operation of the vehicle blower 20a is desired, as in the FIG. 3 arrangement. Omission of the latching contact means 58a would, of course, obviate the reset switch 42a.

Alternatively, the latching feature of the relay 40a can be delayed when the relay and reset circuit 85′ of FIG. 4A is substituted for the relay and reset circuit 85 in FIG. 4. As shown in FIG. 4A and assuming inclusion of the blower 20a, a normally open relay switch 86 is connected with its contacts 88 in series with the latching contact means 58a. The purpose of the relay switch 86 is to remove the latching feature of the relay 40a from the actuating circuit 10a until the last vehicle window arrangement (e.g. the window arrangement 18a, FIG. 4) has been lowered to a predetermined extent as determined by the position of the associated sequencing switch 76 (FIG. 4). When the latter sequencing switch is closed to actuate the vehicle blower arrangement 20a the relay switch 86 is closed to restore the latching circuit for the relay 40a. In furtherance of this purpose the relay switch 86 includes a relay coil 90 coupled across a low resistance shunt denoted schematically at 92 in blower conductor 68′a. Thus, when the window operating system 10′a is used to flush overheated air from the passenger compartment of a closed vehicle, it is necessary only for the individual operating one of the vehicle entry lock assemblies 36a, 38a (FIG. 4) to hold the vehicle key in the overturn position until the last of the vehicle windows is lowered sufficiently to close the blower sequencing switch 76. As soon as the vehicle blower arrangement 20a is thus actuated the driver or other individual can remove the vehicle key from the lock arrangement 36a or 38a and enter the vehicle. The vehicle blower arrangement 20a thereafter is energized continuously until actuation of the normally closed reset switch 42′a. As noted previously, the reset switch 42′a (or any of the reset switches 42, 42′, 42″ or 42a) can be actuated automatically by means of a time-delay switch (not shown) or by actuating the reset switch semiautomatically as by coupling the reset switch to the vehicle ignition switch, to the vehicle gear shift lever, or to an actuating switch for the vehicle's air conditioning equipment. In operation of the window operating system 10′a according to FIG. 4A, the vehicle lock 36a or 38a is retained in its overturn position to retain the closure of lock switch 39a or 41a until one or more of the window arrangements 12a–18a (FIG. 4) are actuated, and also blower 20a if used. It is assumed for example that window arrangements 12a, 14a represent the front and rear windows on the right or front passenger's side of the vehicle while window arrangements 16a, 18a represent respectively the front and rear windows on the driver's side.

In the case of inclement weather the driver can unlock vehicle lock assembly 36a on the driver's side and overturn the lock assembly 36a to close lock switch 39a. If desired, the vehicle key can be held in the overturn position only for the period necessary to lower the front passenger window 12a sufficient for a passenger to insert his arm through the partially opened window 12a and release the inside door lock mechanism. The driver then can release the switch 39a withdraw the vehicle key and enter the automobile, without lowering the remaining windows, or actuating the blower if incorporated in the circuit 10′a, whereupon the one or more windows can be reclosed by operation of a corresponding number of the inside window switches 22a. In this manner neither the driver nor the passenger are exposed for any length of time to inclement weather conditions. If two or more passengers wish to enter the automobile simultaneously, the driver can hold the lock mechanism 36a or 38a in its overturn position for an additional time sufficient to permit successive or sequential lowering of two or more of the window arrangements 12a–18a. As noted previously the necessary interval during which the driver must maintain the vehicle lock assembly 36a or 38a in the overturn position can be shortened by positioning the limit type sequence switches 70–76 above the lower ends of the window paths.

In the event of hot weather, the driver or other occupant with a vehicle key maintains the vehicle key in the overturned position of the door lock assembly 36a or 38a (FIG. 4) until all of the windows 12a–18a are lowered and until operation of the vehicle 20a is commenced. At this time the relay 40′a, as evident from FIG. 4, becomes electrically latched by energization of the blower relay 86, whereupon the vehicle key can be released without discontinuing operation of the vehicle blower 20a. After one or more occupants enter the vehicle, the reset switch 42′a can be actuated to terminate operation of the vehicle blower 20a, and the conventional window switches 22a (FIG. 4) can be actuated to raise the vehicle windows 12a–18a if desired.

It is contemplated that one or more of the window sequencing switches 70, 72, 74 can be omitted, to permit simultaneous operation of some or all of the windows 12′–18′, while blower sequencing switch 76 is employed as described to actuate the blower arrangement 20′ only after the window arrangements 12′–18′ have been actuated. If all of the window sequencing switches 70, 72, 74 are omitted then the window arrangements 12′–18′ would of course be lowered simultaneously as discussed previously in connection with FIG. 1. However, actuation of the blower arrangement 20′ still would be delayed with some reduction in instantaneous battery drain. In the last-mentioned arrangement, it is further contemplated that the relay switch 86 (FIG. 4A) can be omitted such that momentary overturn of the vehicle entry lock 36′ or 38′ would inititate simultaneous lowering of the window arrangements 12′–18′ followed automatically by sequential actuation of the blower arrangement 20′.

From the foregoing it will be seen that a novel and efficient vehicle heat dissipating and/or inclement weather convenience window operating system has been described herein. As described, modifications of the invention permit automatic or semiautomatic control of the window system from a point outside of the vehicle as desired. The descriptive and illustrative materials employed herein, therefore, are utilized for the purpose of exemplifying the invention and not in limitation thereof. Numerous modifications of the invention will occur, therefore, to those skilled in the art without departing from the spirit and scope of the invention. Moreover, it is to be understood that certain features of the invention can be used to advantage without a corresponding use of other features thereof.

It will also be understood that the same system can be employed in aircraft, trucks, busses, mobile homes, domiciles, and all other devices or structures where it is desirable to dissipate heat from within the structure to the outside where it will not be objectionable.

I claim:

1. A vehicle window operating system comprising a plurality of motors for powered vehicle windows having actuating switches for said motors, normally open switch means mounted for external access on an exterior surface of the vehicle, said switch means being connected to an energizing circuit coupled to said window motors in by-passing relation to said motor actuating switches, and a vehicle blower motor coupled to said operating system such that said energizing circuit is connected to said blower motor for aid in dissipating accumulated heat in a passenger compartment of said vehicle.

2. The combination according to claim 1 wherein said blower is a vehicle defrost blower for circulating air to a dome area of said compartment.

3. The combination according to claim 1 wherein said energizing circuit includes an electrically latchable relay connected to said blower motor.

4. The combination according to claim 1 including an actuating switch for said vehicle blower motor, said energizing circuit being connected to said blower motor in by-passing relation to said blower actuating switch.

5. The combination according to claim 1 including circuit means coupled to said energizing circuit for terminating the operation of said window motors and of said blower motor after predetermined intervals.

6. The combination according to claim 1 wherein said energizing circuit includes means for actuating said window motors and said blower motor sequentially, said sequential actuating means including a number of sequencing switches mounted so as to be sensitive respectively to positions of precedingly actuated windows.

7. The combination according to claim 1 wherein said energizing circuit includes means for actuating said window motors and said blower motor sequentially.

8. The combination according to claim 7 wherein said energizing circuit includes an electrically latchable relay connected to said blower motor.

9. A vehicle window operating system comprising a plurality of motors for powered vehicle windows having actuating switches for said motors, normally open switch means mounted for external access on an exterior surface of the vehicle, said switch means being connected to an energizing circuit coupled to said window motors in by-passing relation to said motor actuating switches, said energizing circuit including a relay switching arrangement having contact means coupled to a vehicle battery and coupled respectively to said window motors, said relay arrangement including additional contact means coupled to said battery and to a relay coil of said arrangement in electrically latching relation, a vehicle blower motor and actuating switch therefor coupled to said operating system such that said energizing circuit is connected to said blower motor in by-passing relation to said blower actuating switch, said energizing circuit including means for actuating said window motors and said blower motor sequentially, and a delay circuit is coupled to said latching contact means for delaying operation of said latching contact means until all of said window motors have been actuated.

* * * * *